(12) United States Patent
Prentner et al.

(10) Patent No.: US 12,540,500 B2
(45) Date of Patent: Feb. 3, 2026

(54) HYDRAULIC DAMPER FOR FURNITURE DOORS AND DRAWERS

(71) Applicant: SAMET KALIP VE MADENİ ESYA SAN VE TİC. A.S, Esenyurt/Istanbul (TR)

(72) Inventors: Christian Prentner, Götzis (AT); Nurettin Güzeltepe, Esenyurt/Istanbul (TR); Umut Coskun, Esenyurt/Istanbul (TR)

(73) Assignee: SAMET KALIP VE MADENI ESYA SAN VE TIC. A.S, Esenyurt/Istanbul (TR)

( * ) Notice: Subject to any disclaimer, the term of this patent is extended or adjusted under 35 U.S.C. 154(b) by 68 days.

(21) Appl. No.: 18/844,278

(22) PCT Filed: Dec. 1, 2021

(86) PCT No.: PCT/TR2021/051322
§ 371 (c)(1),
(2) Date: Sep. 5, 2024

(87) PCT Pub. No.: WO2023/101623
PCT Pub. Date: Jun. 8, 2023

(65) Prior Publication Data
US 2025/0137310 A1    May 1, 2025

(51) Int. Cl.
*E05F 5/10*    (2006.01)
*E05F 5/00*    (2017.01)
*E05F 5/02*    (2006.01)

(52) U.S. Cl.
CPC ............ *E05F 5/10* (2013.01); *E05F 5/006* (2013.01); *E05F 5/02* (2013.01);
(Continued)

(58) Field of Classification Search
CPC ..... E05F 5/10; E05F 5/006; E05F 5/02; E05F 5/06; E05F 5/08; E05F 2201/264;
(Continued)

(56) References Cited

U.S. PATENT DOCUMENTS 4,817,238 A * 4/1989 Liu .................. F16F 9/516
                                                                16/84
8,668,062 B2 * 3/2014 Weber ................. E05F 5/10
                                                                188/282.1
(Continued)

FOREIGN PATENT DOCUMENTS

JP    H09504064 A  * 4/1997  ............. E05F 3/108
JP    7508687 B2  * 7/2024  ............. E05F 3/108
(Continued)

*Primary Examiner* — Jeffrey O'Brien
(74) *Attorney, Agent, or Firm* — Nath, Goldberg & Meyer; Joshua B. Goldberg (57) ABSTRACT

Hydraulic damper (1000) for furniture doors or drawers. Damper (1000) comprises housing (1) having closed first end (11) and second end (12) distal thereto, allowing linear reciprocations of rod (2) inside housing (1) along axis (A). Damper (1000) further comprises piston (3) connected to rod (2). Piston (3) defines first and second chambers (13, 14) inside housing (1) along axis (A), respectively at first and second ends (11, 12) of piston (3). Volumes of first and second chambers (13, 14) are variable based on axial-positioning of piston (3) in housing (1) at rod (2) reciprocations. Piston (3) comprises one or more openings (31) around axis (A) providing fluid-flow communication between first and second chambers (13, 14). At first chamber-side of openings (31), piston (3) has ring (4) around axis (A), allowing: fluid-flow communication around axis (A) between first and second chambers (13, 14) with radial first-flow cross-section, when first chamber (13) hydraulic-fluid pressure is≥second chamber (14) hydraulic-fluid pressure; fluid-flow communication having radial second-flow cross-section>first-flow section, when first chamber (13) hydraulic-fluid pressure is<second chamber (14) hydraulic-fluid pressure to axially move ring (4) away from openings (31).

14 Claims, 10 Drawing Sheets

(52) U.S. Cl.
CPC ... *E05Y 2201/256* (2013.01); *E05Y 2201/264* (2013.01); *E05Y 2900/20* (2013.01)

(58) Field of Classification Search
CPC ...... A47B 2210/0094; F16F 9/18; F16F 9/19; F16F 9/348; F16F 9/3481; F16F 9/3482; F16F 9/3484; F16F 9/3485
See application file for complete search history.

(56) References Cited

U.S. PATENT DOCUMENTS

| | | | | |
|---|---|---|---|---|
| 8,925,695 | B2 * | 1/2015 | Rioja Calvo | E05F 5/02 |
| | | | | 188/282.1 |
| 9,534,435 | B2 * | 1/2017 | Dora | F24C 15/023 |
| 9,822,569 | B2 * | 11/2017 | Wang | E05F 3/02 |
| 10,094,157 | B2 * | 10/2018 | Pyo | F16F 9/512 |
| 10,865,597 | B2 * | 12/2020 | Chen | F16F 13/007 |
| 11,230,869 | B2 * | 1/2022 | Weber | F16F 13/007 |
| 2010/0287729 | A1 * | 11/2010 | Jin | E05F 3/12 |
| | | | | 16/72 |
| 2011/0253493 | A1 * | 10/2011 | Svara | F16F 9/3228 |
| | | | | 188/313 |
| 2025/0179854 | A1 * | 6/2025 | Prentner | F16F 9/3415 |

FOREIGN PATENT DOCUMENTS

| | | | | |
|---|---|---|---|---|
| WO | WO-03014590 | A2 * | 2/2003 | |
| WO | WO-2008153224 | A1 * | 12/2008 | E05F 5/006 |

\* cited by examiner

HYDRAULIC DAMPER FOR FURNITURE DOORS AND DRAWERS

This is a National Phase Application filed under 35 U.S.C. 371 as a national stage of PCT/TR2021/051322, filed Dec. 1, 2021, the content of which is hereby incorporated by reference in its entirety.

TECHNICAL FIELD

The present invention relates to hydraulic dampers. In particular, the present invention relates to hydraulic dampers for use in damping furniture doors and drawers.

BACKGROUND

Hydraulic dampers can be used for prevention of impacts at closing of movable furniture parts such as furniture doors and drawers. In case where a user performs repetitive closing re-opening actions on such movable furniture part within a short time interval, respective dampers may not be able to show a consistent damping performance. Furthermore, such repetitions usually cause deformations on inner components of dampers, especially when repeated with short time intervals. This fact results in decreased damper service life.

Accordingly, it is needed to develop a furniture damper with optimal response and enhanced service life.

SUMMARY

A primary object of the present invention is to overcome the above-mentioned shortcomings of the prior art. Another object of the present invention is to provide a hydraulic furniture damper with an optimized response in returning its normal state upon a closing action. A further object of the present invention is to provide a hydraulic furniture damper with high mechanical stability and with an increased service life. The present invention achieves said objects with the combination of features proposed in the appended claims.

The present invention proposes a hydraulic damper for use in furniture doors or drawers. The damper comprises a housing that has a closed first end and a second end that is distal to the first end and that is arranged for allowing linear reciprocations of a rod inside the housing along an axis between the first end and second end. The damper further comprises a piston connected to the rod. The piston is arranged for defining a first chamber and a second chamber inside the housing along the axis, respectively at a first end side and a second end side of the piston, such that respective volumes of the first chamber and second chamber are variable in accordance with axial positioning of the piston in the housing at reciprocations of the rod. The piston comprises one or more openings around the axis that provide fluid flow communication between the first chamber and second chamber. At a first chamber side of the openings, the piston is provided with a ring around the axis. The ring is arranged to allow fluid flow communication around the axis between the first chamber and the second chamber. The ring is arranged such that said fluid flow communication has a radial first flow cross-section, when a hydraulic fluid pressure in the first chamber is equal to or greater than the hydraulic fluid pressure in the second chamber. The ring is further arranged such that said fluid flow communication has a radial second flow cross-section that is greater than said first flow section, when a hydraulic fluid pressure in the first chamber is smaller than the hydraulic fluid pressure in the second chamber to axially move the ring away from the openings.

In a preferred embodiment of the damper according to the present invention, the ring can be arranged to be axially flex away from the openings, such that said second flow cross-section is availed by axial flexion of the ring when the hydraulic fluid pressure in the first chamber is smaller than the hydraulic fluid pressure in the second chamber.

In any of the embodiments of the damper according to the present invention, the piston can be provided with a clamping means arranged for delimiting a translational movement range for the ring relative to the piston towards the first end.

In any of the embodiments of the damper according to the present invention, the ring can be arranged for biasing onto the openings when the hydraulic fluid pressure in the second chamber does not exceed the hydraulic fluid pressure in the first chamber, and for axially flexing away from the openings when the hydraulic fluid pressure in the second chamber exceeds the hydraulic fluid pressure in the first chamber.

In a preferred embodiment of the damper according to the present invention, the piston can have a side surface that is circumferentially in contact with an inner surface of the housing.

In a preferred embodiment of the damper according to the present invention, the openings can be provided in-between the axis and the side surface, the openings can have a first radial width defined between a first radius and a second radius that is greater than the first radius, and the ring can have an inner radius that is greater than said first radius to axially define a gap in-between the first radius and inner radius.

In a preferred embodiment of the damper according to the present invention, the ring can have an outer radius that is greater than the second radius.

In a preferred embodiment of the damper according to the present invention, the clamping means can be provided at the first chamber side of the openings, around the axis; such that the clamping means radially extends from the axis at a clamping radius that is greater than the inner radius.

A preferred embodiment of the damper according to the present invention can be provided with a first elastic means that is arranged to axially bias the piston away from the first end.

In a preferred embodiment of the damper according to the present invention, the first elastic means can be disposed between the first end and the piston.

Any of the embodiments of the damper according to the present invention can preferably be provided with a seal circumferentially disposed around the rod, arranged for preventing hydraulic liquid leakage from the second chamber towards the second end.

In a preferred embodiment of the damper according to the present invention, the housing can be provided with an extended diameter around an axial locus of the seal to have a value that is higher than an inner diameter of the housing around an axial locus of the piston.

A preferred embodiment of the damper according to the present invention can be provided with a second elastic means that is arranged for axially biasing the seal away from the second end.

In a preferred embodiment of the damper according to the present invention, the second elastic means can be disposed between the seal and a lid that is provided at the second end.

A preferred embodiment of the damper according to the present invention can be provided with a supporting means in-between the seal and second elastic means, arranged for bearing the second elastic means and for uniformly distributing mechanical forces from the second elastic means onto the seal.

The present invention further proposes a furniture hinge or furniture drawer that is provided with any of the damper embodiments that are summarized above.

BRIEF DESCRIPTION OF FIGURES

The figures, a brief explanation of which is herewith provided, are solely intended for providing a better understanding of the present invention and are as such not intended to define the scope of protection or the context in which said scope is to be interpreted in the absence of the description.

FIG. 2b shows an axial section view based on FIG. 2a.

FIG. 3b shows a perspective view of the assembly that is depicted in FIG. 3a.

FIG. 4b shows an axial section view based on FIG. 4a.

FIG. 5a shows a partial cutaway view of the embodiment shown in FIG. 1 at an instance where the rod is pushed into the housing at a greater extent when compared to that shown in FIG. 4a.

FIG. 5b shows an axial section view based on FIG. 5a.

DETAILED DESCRIPTION

Figure 1:
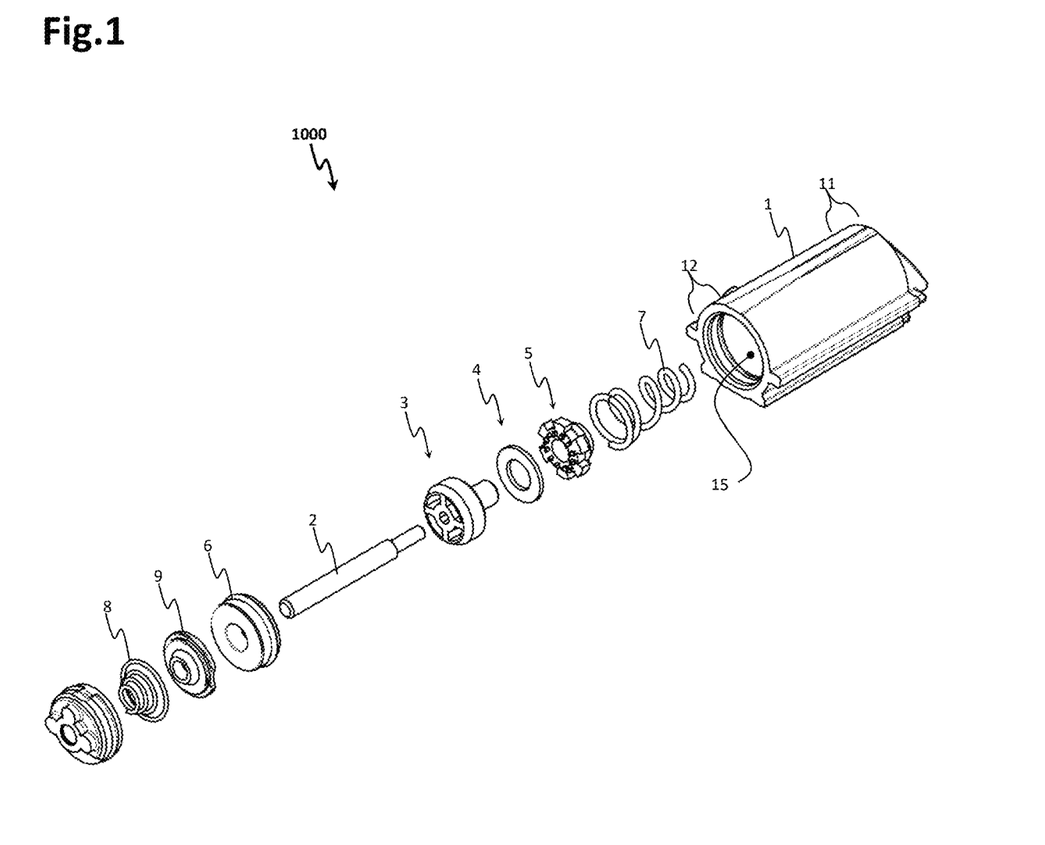
FIG. 1 shows an exploded view of an exemplary embodiment of the damper according to the present invention.

Referring to the figures outlined above, the present invention proposes a hydraulic damper (1000) for use in damping furniture doors or drawers. FIG. 1 shows an exploded view of an exemplary embodiment of the damper (1000) according to the present invention.

The damper (1000) comprises a housing (1) that has a closed first end (11) and a second end (12) that is distal to the first end (11) and that is arranged for allowing linear reciprocations of a rod (2) inside the housing (1) along an axis (A) between the first end (11) and second end (12). The damper further comprises a piston (3) connected to the rod (2), the piston (3) is arranged for defining a first chamber (13) and a second chamber (14) inside the housing (1) along the axis (A), respectively at a first end (11) side and a second end (12) side of the piston (3), such that respective volumes of the first chamber (13) and second chamber (14) are variable in accordance with axial positioning of the piston (3) in the housing (1) at reciprocations of the rod (2). The piston (3) comprises one or more openings (31) around the axis (A) that provide fluid flow communication between the first chamber (13) and second chamber (14). At a first chamber side of the openings (31), the piston (3) is provided with a ring (4) around the axis (A). The ring (4) is arranged to allow fluid flow communication around the axis (A) between the first chamber (13) and the second chamber (14). The ring (4) is arranged such that said fluid flow communication has a radial first flow cross-section, when a hydraulic fluid pressure in the first chamber (13) is equal to or greater than the hydraulic fluid pressure in the second chamber (2). The ring (4) is further arranged such that said fluid flow communication has a radial second flow cross-section that is greater than said first flow section, when the hydraulic fluid pressure in the first chamber (13) is smaller than the hydraulic fluid pressure in the second chamber (14) to axially move the ring (4) away from the openings (31).

Figure 2A:
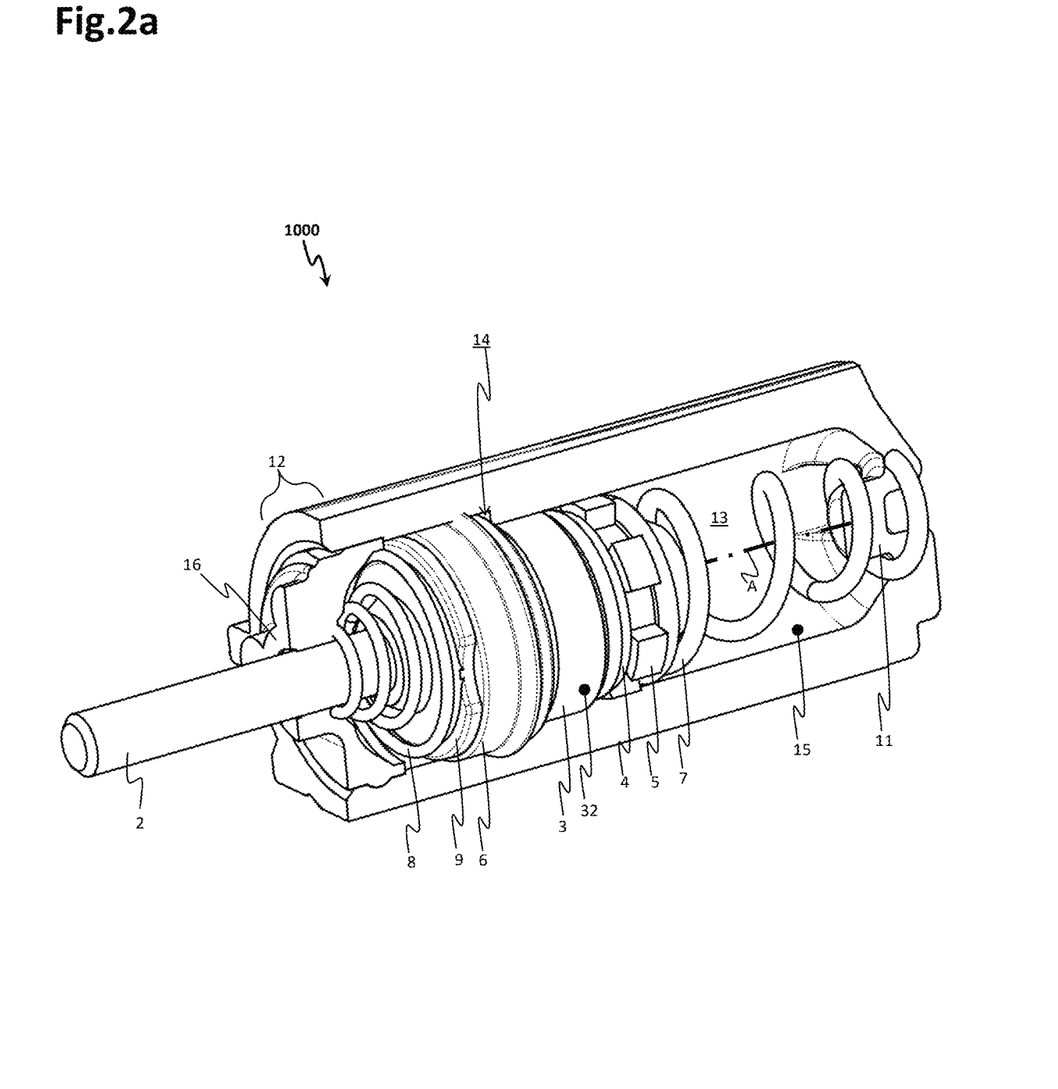
FIG. 2a shows a partial cutaway perspective view of the embodiment shown in FIG. 1 at a neutral state.
Figure 2B:
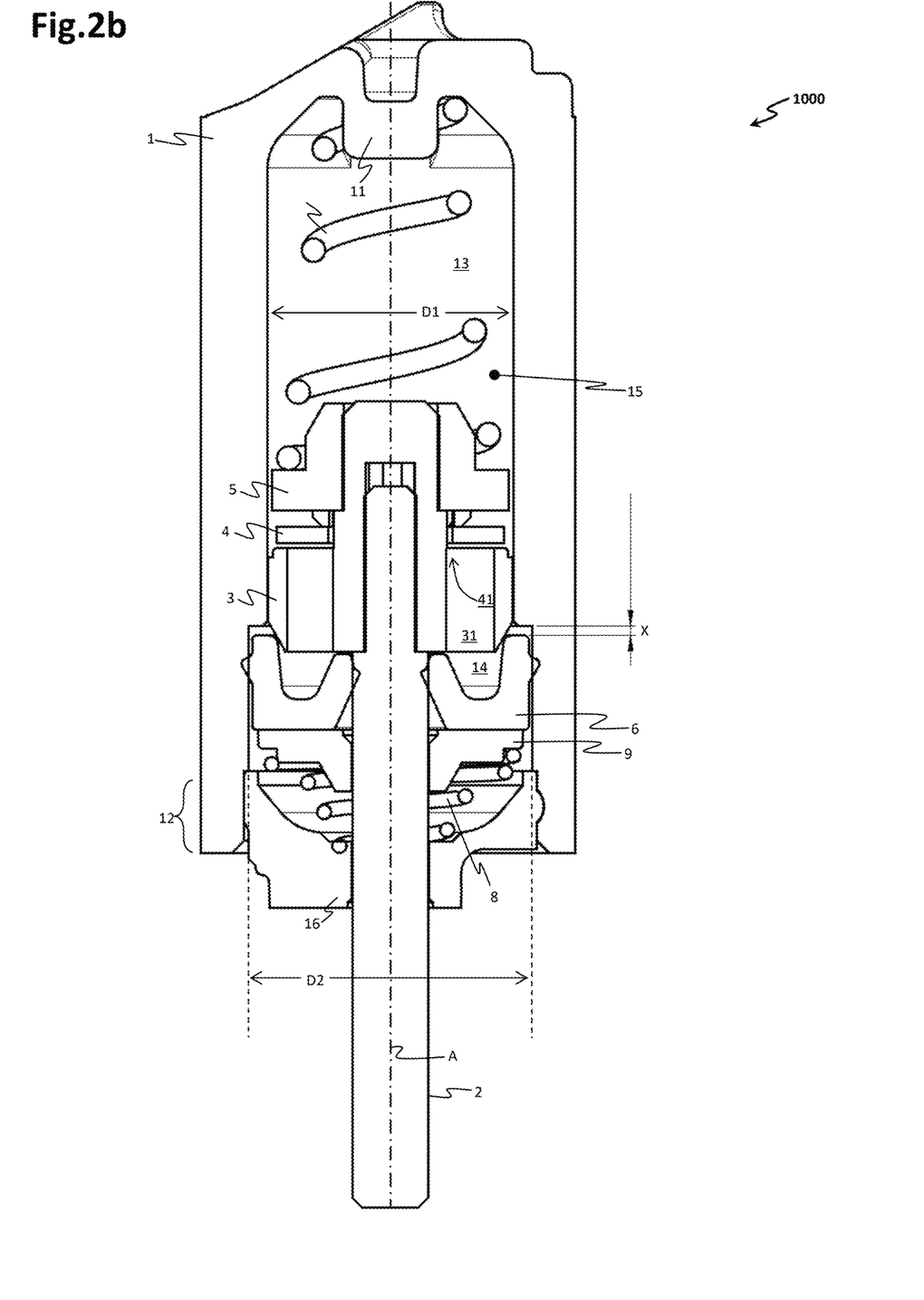

FIG. 2a shows a partial cutaway perspective view of the embodiment shown in FIG. 1 at a neutral state. The neutral state corresponds to an instance where the axial forces (here: hydraulic pressure forces and spring forces) applying onto the piston (3) are balanced to produce a force resultant equal to zero. FIG. 2b shows an axial section view based on FIG. 2a.

Figure 3A:
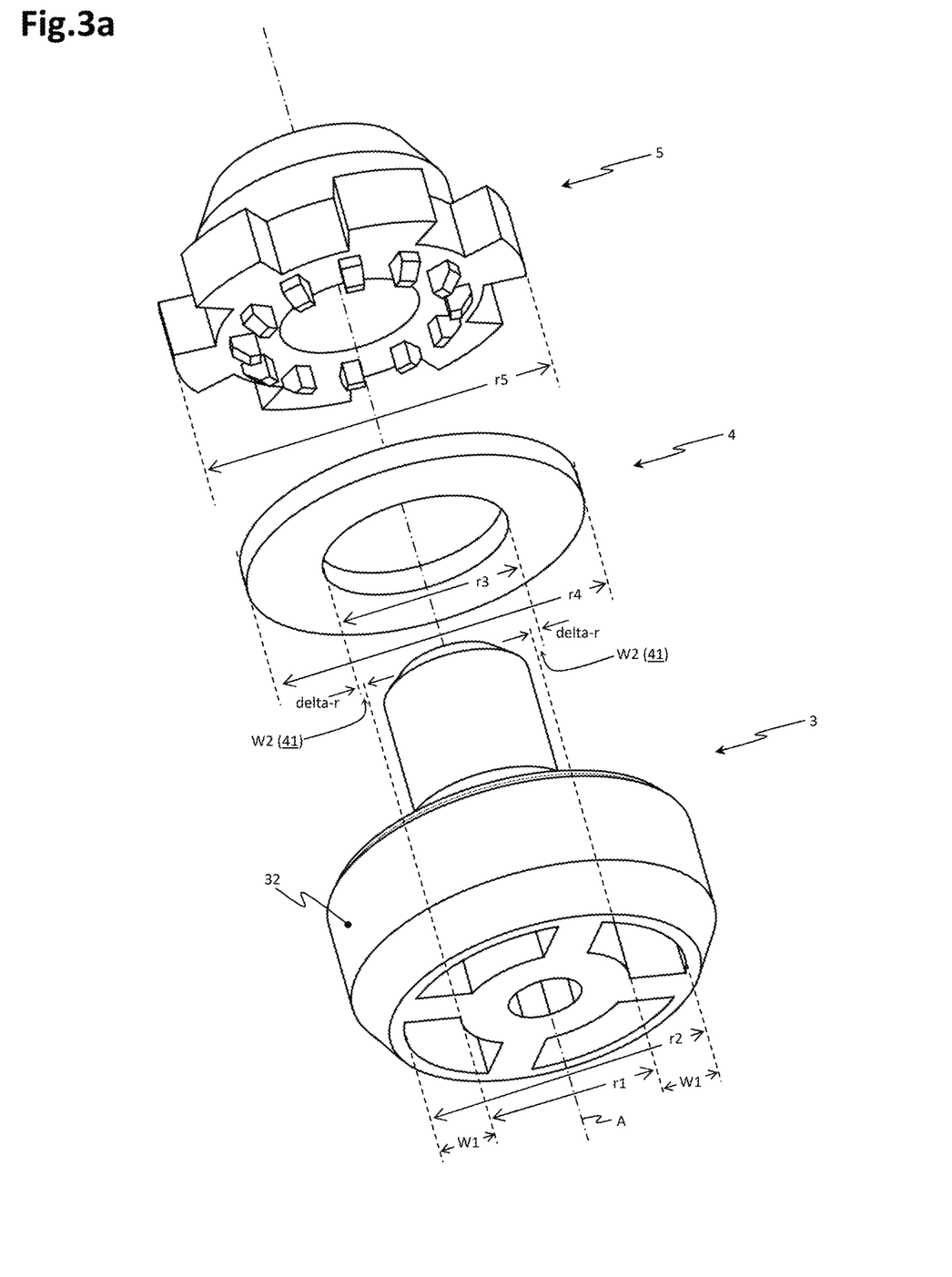
FIG. 3a shows an exploded perspective view of an exemplary assembly that includes a piston, a ring and a clamping means for being employed in a damper according to the present invention.
Figure 3B:
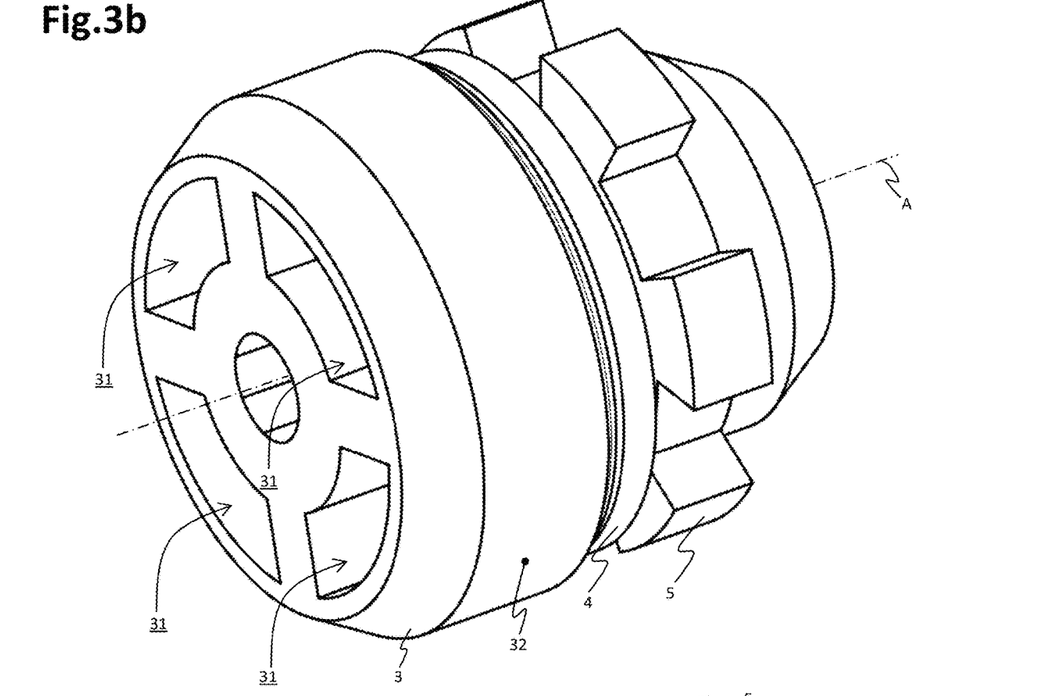
Figure 3C:
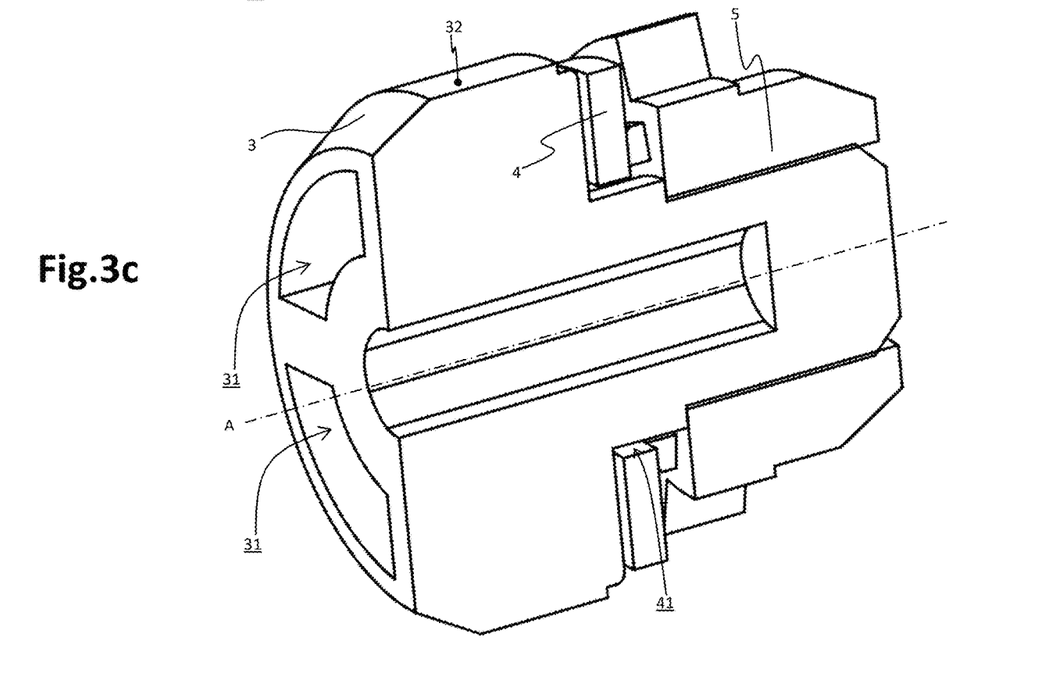
FIG. 3c shows a perspective section of the assembly that is depicted in FIG. 3b.

FIG. 3a shows an exploded perspective view of an exemplary assembly that includes a piston (3), a ring (4) and a clamping means (5) for being employed in a damper (1000) according to the present invention. FIG. 3b shows a perspective view of the assembly that is depicted in FIG. 3a. FIG. 3c shows a perspective section of the assembly that is depicted in FIG. 3b.

Figure 4A:
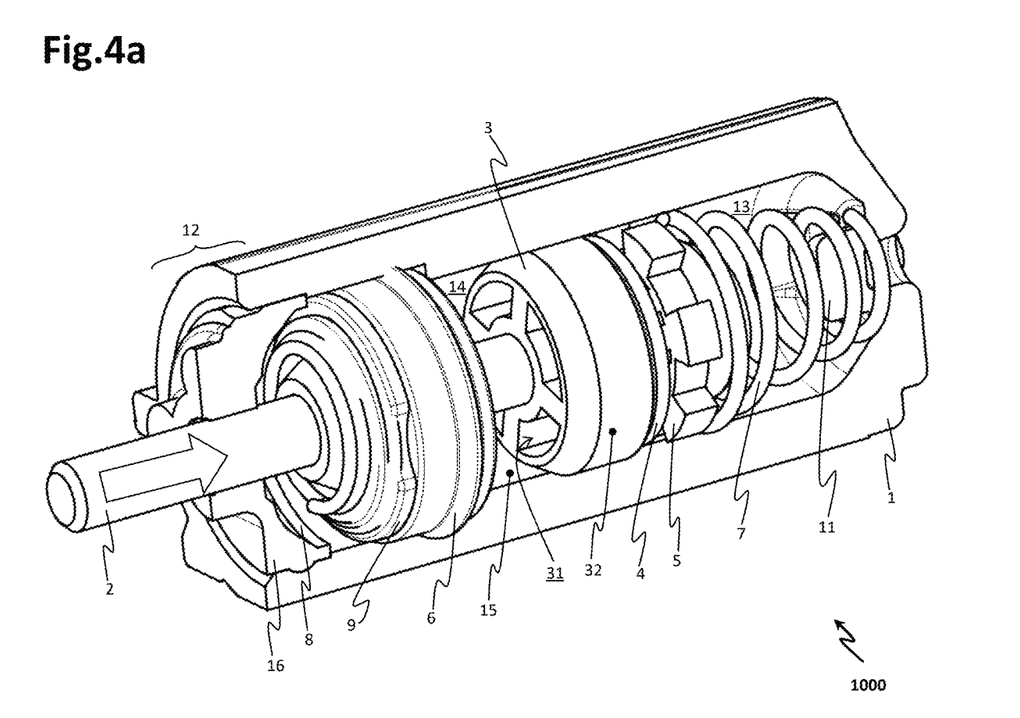
FIG. 4a shows a partial cutaway view of the embodiment shown in FIG. 1 at an instance where the rod is pushed into the housing.
Figure 4B:
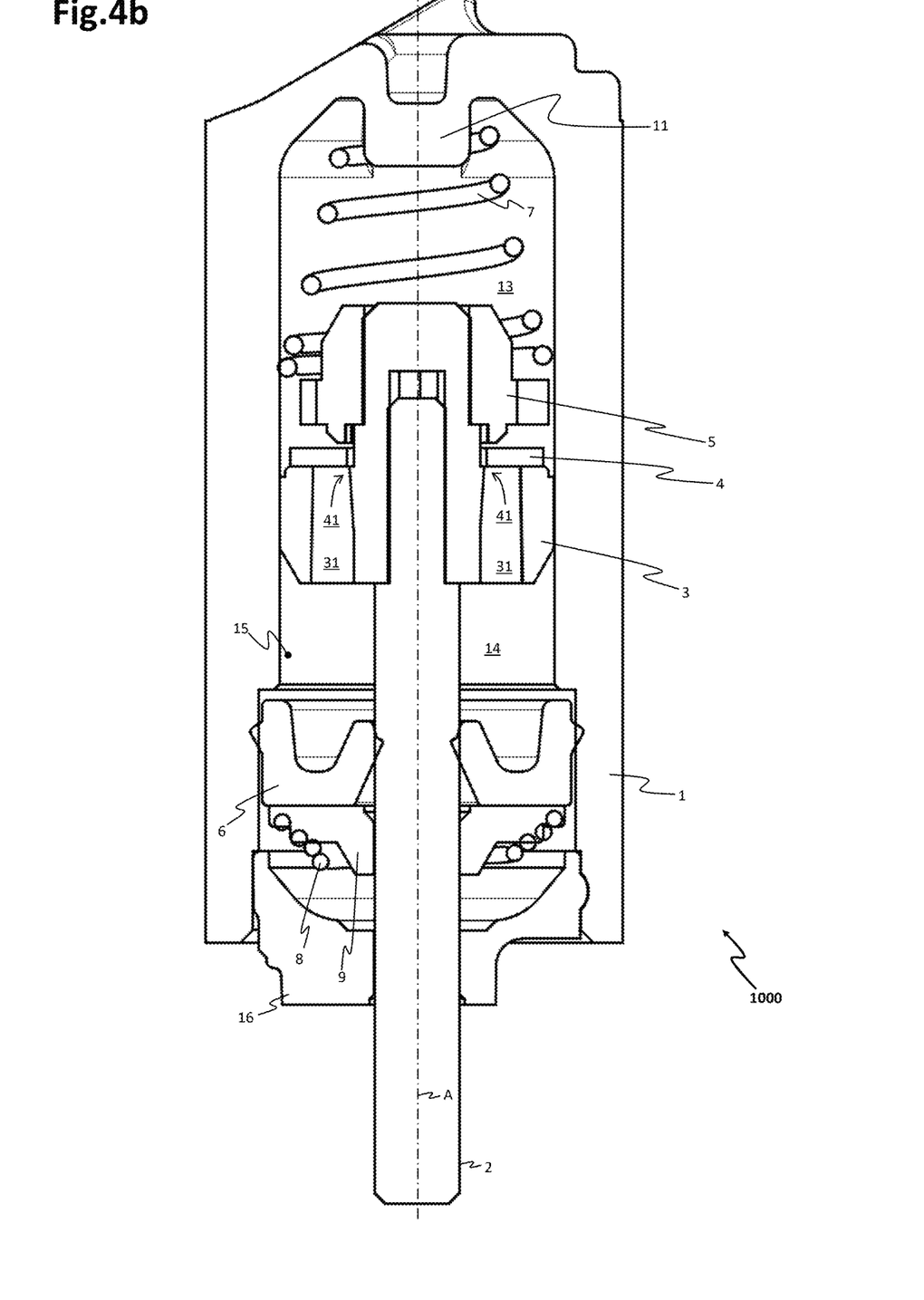

FIG. 4a shows a partial cutaway view of the embodiment shown in FIG. 1 at an instance where the rod (2) is pushed into the housing (1). FIG. 4b shows an axial section view based on FIG. 4a. Here, the direction in which the rod (2) is pushed/moved is represented using a bold, white arrow. The hydraulic fluid in the first chamber (13) forces the ring (4) in the opposite direction, thereby biasing the ring (4) onto the piston (3). The hydraulic fluid from the first chamber (13) starts flowing through the gap (41), to travel over the openings (31), to reach the second chamber (14) for balancing the pressure difference between the first chamber (13) and second chamber (14).

Figure 5A:
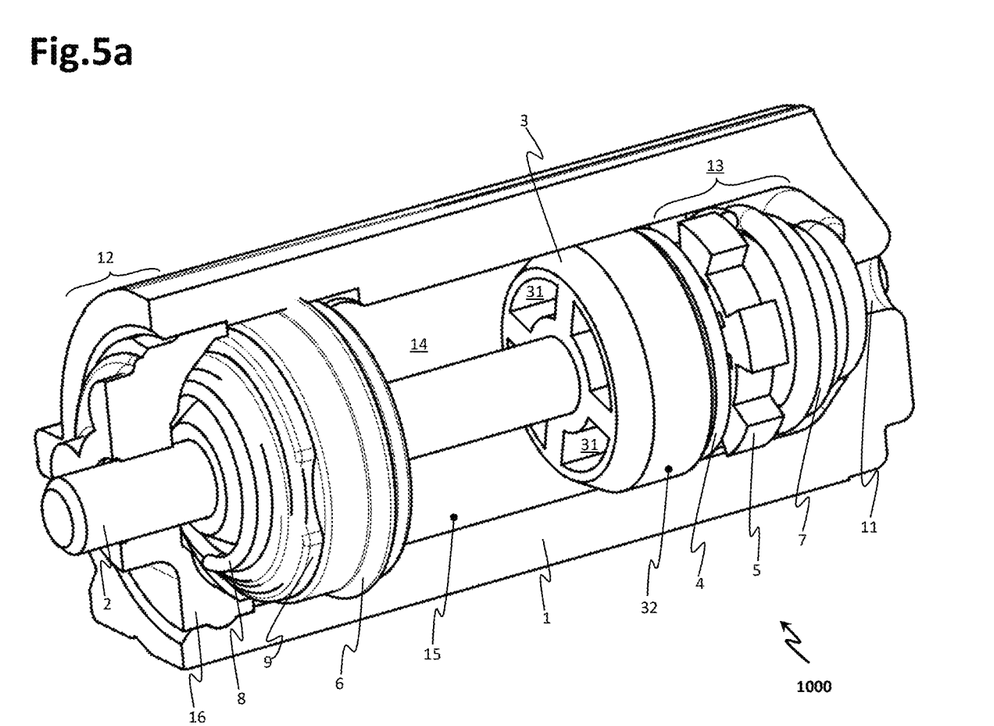
Figure 5B:
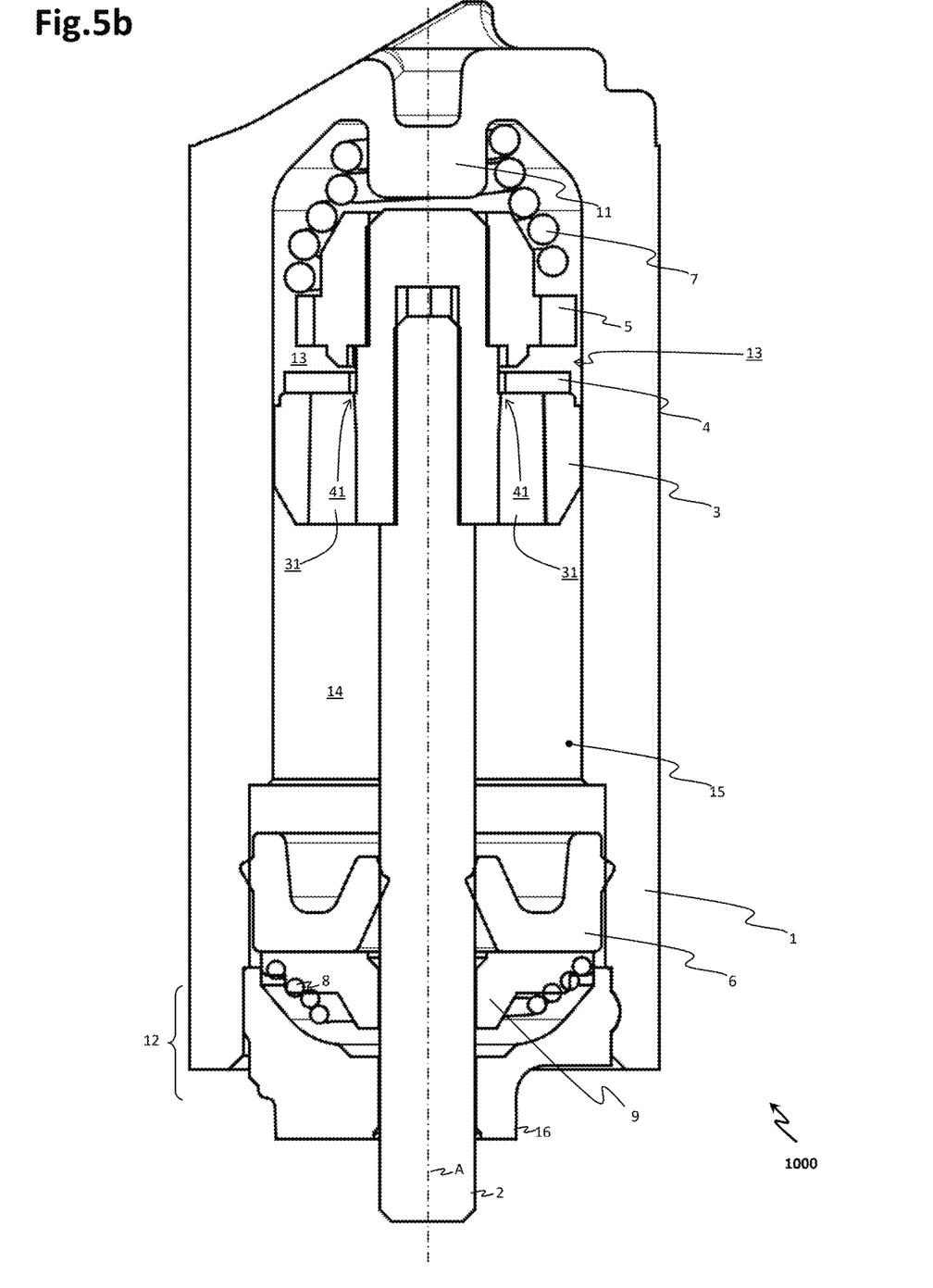

FIG. 5a shows a partial cutaway view of the embodiment shown in FIG. 1 at an instance where the rod (2) is pushed into the housing (1) at a greater extent when compared to that shown in FIG. 4a. FIG. 5b shows an axial section view based on FIG. 5a. Here, the hydraulic fluid in the first chamber (13) forces the ring in the opposite direction, thereby biasing the ring (4) onto the piston (3). Then, the increased hydraulic pressure in the second chamber (14) biases the seal (6) towards the second end (12). At such instance, energy is accumulated in both the first elastic means (7) and second elastic means (8) to respectively force the piston (3) and seal (6) to recover their original positions.

Figure 6:
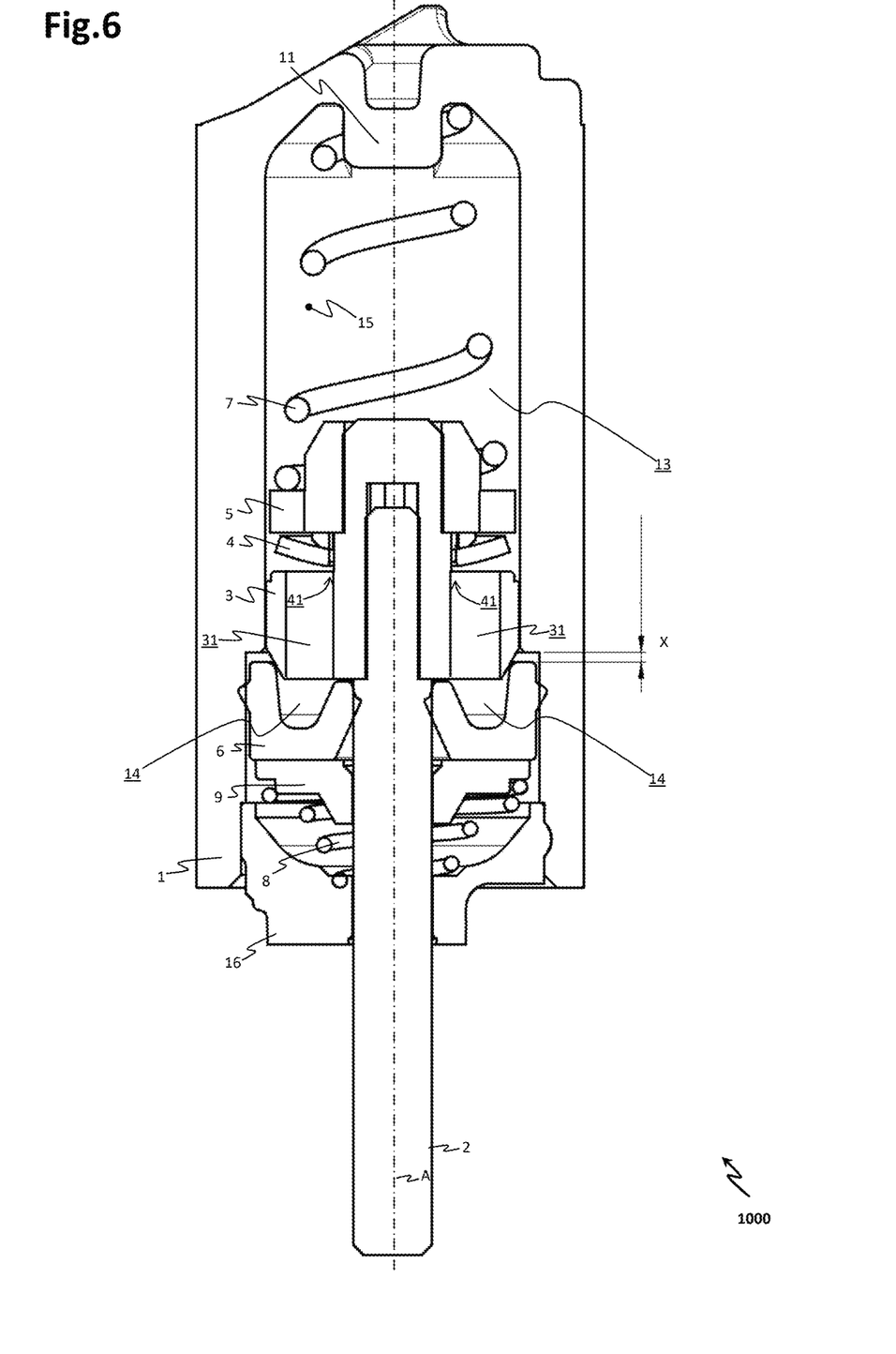
FIG. 6 is a perspective view of an exemplary damper according to the present invention. Here, the assembly is arranged to allow the ring to translate and simultaneously flex axially towards the first end.

FIG. 6 is a perspective view of an exemplary damper (1000) according to the present invention. Here, the assembly is arranged to allow the ring (4) to translate and simultaneously flex axially towards the first end (11). The clamping means (5) is arranged to delimit a translational movement of the ring (4) relative to the piston (3) towards the first end (11), at a radially central portion of the ring (4); and to allow a greater extent of axial flexion of the ring (4) at its radially distal portions with regard to the axis. In such case, the increment of flow cross-section by translational movement of the ring (4) away from the opening (31) is enhanced by the axial flexion.

Within the context of the present application, the ring (4) can be considered to partially cover the openings (31). The extent of partial covering is decreased at instances where the ring (4) is moved away from the openings (31) due to excessive hydraulic fluid pressure in the second chamber (14) when compared to that in the first chamber (13). The movement of the ring (4) away from the openings (31) can be arranged by an axial translation of the ring (4), and/or an axial flexion of the ring (4).

In a preferred embodiment of the damper (1000) according to the present invention, the ring (4) can be arranged to be axially flex away from the openings (31), such that said second flow cross-section is availed by axial flexion of the ring (4) when the hydraulic fluid pressure in the first chamber (13) is smaller than the hydraulic fluid pressure in the second chamber (14).

In any of the embodiments of the damper (1000), the piston (3) can be provided with a clamping means (5), that is arranged for delimiting a translational movement range for the ring (4) relative to the piston (3) towards the first end (11).

In any of the embodiments of the damper (1000), the ring (4) can be arranged for biasing onto the openings (31) when the hydraulic fluid pressure in the second chamber (14) does not exceed the hydraulic fluid pressure in the first chamber (13), and for axially flexing away from the openings (31) when the hydraulic fluid pressure in the second chamber (14) exceeds the hydraulic fluid pressure in the first chamber (13).

In a preferred embodiment of the damper (1000), the piston (3) can have a side surface (32) circumferentially facing the inner surface (15) of the housing (1). The side surface (32) is preferably arranged for allowing the piston (3) to reciprocate along the axis (A), and simultaneously for blocking hydraulic fluid from passing in-between the inner surface (15) and side surface (32). For instance, a radial distance between the side surface (32) and inner surface (15) can be up to 0.02 mm, for instance, within a range between 0.01 mm and 0.02 mm, taken the dimensions of a furniture damper and flow properties of a hydraulic fluid to be employed in a furniture damper (e.g., available extents of viscosity at room temperature).

Preferably, the side surface (32) is circumferentially in contact with an inner surface (15) of the housing (1). Such embodiment enables blockage of fluid flow communication between the first chamber (13) and second chamber (14) over the side surface (32) at all times. This measure can be considered as an exemplary and preferred way to arrange that the fluid flow communication between the first chamber (13) and second chamber (14) is available only through the openings (31).

In a preferred embodiment of the damper (1000), the openings (31) can be provided in-between the axis (A) and the side surface (32), the openings (31) can have a first radial width (W1) defined between a first radius (r1) and a second radius (r2) that is greater than the first radius (r1), and the ring (4) can have an inner radius (r3) that is greater than said first radius (r1) to axially define a gap (41) in-between the first radius (r1) and inner radius (r3). The gap (41) can be considered to have a second radial width (W2) that corresponds to a difference (delta-r) between the first radius (r1) and said inner radius (r3). This measure can be considered as an exemplary and preferred way to arrange that the fluid flow communication between the first chamber (13) and second chamber (14) is available through the gap (41).

In a preferred embodiment of the damper (1000), the ring (4) can have an outer radius (r4) that is greater than the second radius (r2). This measure can be considered as an exemplary and preferred way to arrange that the fluid flow communication between the first chamber (13) and second chamber (14) is available only to through the gap (41) when the ring (4) is in axially in contact with the openings (31) to cover the openings (31) around the vicinity of the second radius (r2) at instances where the hydraulic pressure at the second chamber (14) does not exceed that at the first chamber (13). At instances where the hydraulic pressure at the second chamber (14) does not exceed that at the first chamber (13), the ring (4) circumferentially contacts to the piston (3) to block fluid flow communication around the second radius (r2). Thus, the availability of the fluid flow communication is delimited such that the same only takes place at the gap (41) at instances where the hydraulic pressure at the second chamber (14) does not exceed that at the first chamber (13).

In a preferred embodiment of the damper (1000), the clamping means (5) can be provided at the first chamber (13) side of the openings (31), around the axis (A); such that the clamping means (5) radially extends from the axis (A) at a clamping radius (r5) that is greater than the inner radius (r3). This measure can be considered as an exemplary and preferred way to arrange that the clamping means (5) blocks the translational movement of the ring (4) relative to the piston (3) at a radially central portion of the ring (4); and allows flexing of the ring (4) away from the openings (31) at portions radially distal with respect to the axis (A) when the hydraulic pressure at the second chamber (14) exceeds the hydraulic pressure at the first chamber (13). Hence, at such instances, an even higher extent of axial flow cross-section is available around the ring (4).

A preferred embodiment of the damper (1000) according to the present invention can be provided with a first elastic means (7) that is arranged to axially bias the piston (3) away from the first end (11).

In a preferred embodiment of the damper (1000) according to the present invention, the first elastic means (7) can be disposed between the first end (11) and the piston (2). For instance, such first elastic means (7) can be (or, include) a compression spring.

Any of the embodiments of the damper (1000) according to the present invention can preferably be provided with a seal (6) circumferentially disposed around the rod (2), arranged for preventing hydraulic liquid leakage from the second chamber (14) towards the second end (12). The seal (6) can include (or, be made of) an elastic material.

In a preferred embodiment of the damper (1000) according to the present invention, the housing (1) can be provided with an extended diameter (D2) around an axial locus of the seal (6) to have a value that is higher than an inner diameter (D1) of the housing (1) around an axial locus of the piston (3). The extended diameter (D2) provides a limitation to an axial trajectory of the seal (6) in a direction towards the first end (11).

A preferred embodiment of the damper (1000) according to the present invention can be provided with a second elastic means (8) that is arranged for axially biasing the seal (6) away from the second end (12). At instances where the hydraulic pressure in the second chamber (14) increases, the seal (6) can be axially translated towards the second end (12), simultaneously accumulating energy in the second elastic means (8). Such translational movement of the seal (6) can be considered to correspond to an axial distance (X) along the axial locus of the seal (6). The second elastic means (8) enables the seal (6) to an original position thereof when the hydraulic pressure in the second chamber (14) decreases, by transferring the accumulated energy onto the seal (6) in a direction towards the first end (11).

In a preferred embodiment of the damper (1000) according to the present invention, the second elastic means (8) can be disposed between the seal (6) and a lid (16) that is provided at the second end (12). For instance, such second elastic means (8) can be (or, include) a compression spring.

A preferred embodiment of the damper (1000) according to the present invention can be provided with a supporting means (9) in-between the seal (6) and second elastic means (8), arranged for bearing the second elastic means (8) and for uniformly distributing mechanical forces from the second elastic means (8) onto the seal (6).

The axial translational movement of the rod (2) towards the first end (11) can be considered as a closing action to be damped, with regard to a movable furniture part in which the damper (1000) is employed. The damping is achieved by the flow of hydraulic fluid from the first chamber (13) towards the second chamber (14) through the gap (41). When the closing action is ceased, the axial forces applying onto the piston (3) results in that the ring (4) at least partially moves away from the openings (31), thereby increasing the flow cross-section when compared to that available at the closing action. Hence, the amount of hydraulic fluid that is temporarily transferred from the first chamber (13) into the second chamber (14), rapidly returns into the first chamber (13) at the recovery action of the piston (1000) in order to take its neutral state. The reason of this rapid recovery is that the increased flow cross-section at the recovery action corresponds to a decreased pressure drop during the fluid flow, when compared to the extent of pressure drop at damping, at which fluid flow is delimited to take place through the gap (41).

Thus, any embodiment of the damper (1000) proposed within the context of the present application allows a quick recovery, that is, an optimized response in returning its normal state upon a closing action.

Any embodiment of the damper (1000) proposed within the context of the present application provides a high mechanical stability and with an increased service life.

The present invention further proposes a furniture hinge or furniture drawer that is provided with any of the above-summarized embodiments of the damper (1000). All the advantages related to the damper embodiments according to the present invention are thus attributable to such furniture hinge and furniture drawer.

REFERENCE SIGNS 1 housing
11 first end
12 second end
13 first chamber
14 second chamber
15 inner surface
16 lid
2 rod
3 piston
31 opening
32 side surface
4 ring
41 gap
5 clamping means
6 seal
7 first elastic means
8 second elastic means
9 supporting means
1000 damper
D1 inner diameter
D2 extended diameter
delta-r difference between the first radius and inner radius
r1 first radius
r2 second radius
r3 inner radius
r4 outer radius
r5 clamping radius
W1 first radial width
W2 second radial width

The invention claimed is:

1. A hydraulic damper (1000) for use in furniture doors or drawers, comprising
    a housing (1) that has a closed first end (11) and a second end (12) that is distal to the first end (11) and that is arranged for allowing linear reciprocations of a rod (2) inside the housing (1) along an axis (A) between the first end (11) and second end (12); and
    a piston (3) connected to the rod (2), the piston (3) is arranged for defining a first chamber (13) and a second chamber (14) inside the housing (1) along the axis (A), respectively at a first end (11) side and a second end (12) side of the piston (3), such that respective volumes of the first chamber (13) and second chamber (14) are variable in accordance with axial positioning of the piston (3) in the housing (1) at reciprocations of the rod (2);
    wherein
    the piston (3) comprises one or more openings (31) around the axis (A) that provide fluid flow communication between the first chamber (13) and second chamber (14);
    at a first chamber (13) side of the openings (31), the piston (3) is provided with a ring (4) around the axis (A), that is arranged to allow fluid flow communication around the axis (A) between the first chamber (13) and the second chamber (14) with a radial first flow cross-section, when a hydraulic fluid pressure in the first chamber (13) is equal to or greater than the hydraulic fluid pressure in the second chamber (2) and with a radial second flow cross-section that is greater than said first flow section, when a hydraulic fluid pressure in the first chamber (13) is smaller than the hydraulic fluid pressure in the second chamber (14) to axially move the ring (4) away from the openings (31);
    wherein the ring (4) is arranged to axially flex away from the openings (31), such that said second flow cross-section is availed by axial flexion of the ring (4) when the hydraulic fluid pressure in the first chamber (13) is smaller than the hydraulic fluid pressure in the second chamber (14).

2. Damper according to claim 1, wherein the piston (3) is provided with a clamping means (5) arranged for delimiting a translational movement range for the ring (4) relative to the piston (3) towards the first end (11).

3. Damper according to claim 1, wherein the ring (4) is arranged for biasing onto the openings (31) when the hydraulic fluid pressure in the second chamber (14) does not exceed the hydraulic fluid pressure in the first chamber (13), and for axially flexing away from the openings (31) when the hydraulic fluid pressure in the second chamber (14) exceeds the hydraulic fluid pressure in the first chamber (13).

4. Damper according to claim 1, wherein the piston (3) has a side surface (32) that is circumferentially in contact with an inner surface (15) of the housing (1).

5. Damper according to claim 4, wherein the openings (31) are provided in-between the axis (A) and the side surface (32), the openings (31) have a first radial width (W1) defined between a first radius (r1) and a second radius (r2) that is greater than the first radius (r1), and the ring (4) has an inner radius (r3) that is greater than said first radius (r1) to axially define a gap (41) in-between the first radius (r1) and inner radius (r3).

6. Damper according to claim 5, wherein the ring (4) has an outer radius (r4) that is greater than the second radius (r2).

7. Damper according to claim 5, wherein the clamping means (5) is provided at the first chamber side of the openings (31), around the axis (A), the clamping means (5) radially extends from the axis (A) at a clamping radius (r5) that is greater than the inner radius (r3).

8. Damper according to claim 1, provided with a first elastic means (7) that is arranged to axially bias the piston (3) away from the first end (11).

9. Damper according to claim 8, wherein the first elastic means (7) is disposed between the first end (11) and the piston (3).

10. Damper according to claim 1, provided with a seal (6) circumferentially disposed around the rod (2), arranged for preventing hydraulic liquid leakage from the second chamber (14) towards the second end (12).

11. Damper according to claim 10, wherein the housing (1) is provided with an extended diameter (D2) around an axial locus of the seal (6) to have a value that is higher than an inner diameter (D1) of the housing (1) around an axial locus of the piston (3).

12. Damper according to claim 10, provided with a second elastic means (8) that is arranged for axially biasing the seal (6) away from the second end (12).

13. Damper according to claim 12, wherein the second elastic means (8) is disposed between the seal (6) and a lid (16) that is provided at the second end (12).

14. Damper according to claim 10, provided with a supporting means (9) in-between the seal (6) and second elastic means (8), arranged for bearing the second elastic means (8) and for uniformly distributing mechanical forces from the second elastic means (8) onto the seal (6).

* * * * *